United States Patent
Kendrick et al.

(10) Patent No.: US 8,994,784 B2
(45) Date of Patent: Mar. 31, 2015

(54) WIDE FIELD IMAGE DISTORTION CORRECTION

(75) Inventors: Richard L. Kendrick, San Mateo, CA (US); Samuel T. Thurman, Broomfield, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 472 days.

(21) Appl. No.: 13/336,985

(22) Filed: Dec. 23, 2011

(65) Prior Publication Data

US 2012/0162359 A1    Jun. 28, 2012

Related U.S. Application Data

(60) Provisional application No. 61/427,146, filed on Dec. 24, 2010.

(51) Int. Cl.
| | |
|---|---|
| H04N 7/00 | (2011.01) |
| H04N 5/225 | (2006.01) |
| H04N 5/372 | (2011.01) |
| H04N 5/357 | (2011.01) |
| H04N 1/047 | (2006.01) |
| H04N 1/053 | (2006.01) |

(52) U.S. Cl.
CPC ......... *H04N 5/37206* (2013.01); *H04N 5/3572* (2013.01); *H04N 1/0473* (2013.01); *H04N 1/053* (2013.01)
USPC ............................................. 348/36; 348/169

(58) Field of Classification Search
None
See application file for complete search history.

(56) References Cited

U.S. PATENT DOCUMENTS

| | | | |
|---|---|---|---|
| 5,760,431 | A | 6/1998 | Savoye et al. |
| 6,489,992 | B2 | 12/2002 | Savoye |
| 2002/0079450 | A1 | 6/2002 | Wood |
| 2004/0135914 | A1 | 7/2004 | Wen |
| 2010/0066850 | A1 | 3/2010 | Wilson et al. |
| 2011/0187880 | A1* | 8/2011 | Jelinek ....................... 348/222.1 |

FOREIGN PATENT DOCUMENTS

GB    2461042 A    12/2009

OTHER PUBLICATIONS

Burke, B.E., et al.; "The Orthogonal-transfer Array: A New CCD Architecture for Astronomy"; Proceedings of the Society of Photo-Optical Instrumentation Engineers; vol. 5499; Jun. 21, 2004.
Kendrick, R.L., et al.; "Orthogonal Transfer CCD for Compensation of Image Distortion"; Proceedings of the Society of Photo-Optical Instrumentation Engineers; vol. 8176; Sep. 19, 2011.

* cited by examiner

*Primary Examiner* — Heather Jones
(74) *Attorney, Agent, or Firm* — McDermott Will & Emery LLP

(57) ABSTRACT

A method and apparatus of correcting image distortion using an orthogonal transfer charge-coupled device array is provided. A wide field of view line-scan remote sensing system includes an array of orthogonal transfer charge-coupled devices (OTCCDs) configured to record image data of an optical image of a moving object received from a lens. Further, the system includes a processor coupled to the array of OTCCDS, in which the processor is configured to scan the optical image across the array of OTCCDs; and shift pixel charges along a first axis and a second axis that substantially matches an actual image motion of the moving object while the optical image is being scanned in order to reduce an amount of image distortion across the array of OTCCDs.

37 Claims, 7 Drawing Sheets

WIDE FIELD IMAGE DISTORTION CORRECTION

CROSS-REFERENCE TO RELATED APPLICATIONS

The present application claims the benefit of U.S. Provisional Patent Application Ser. No. 61/427,146, entitled "WIDE FIELD IMAGE DISTORTION CORRECTION," filed on Dec. 24, 2010, of which is hereby incorporated by reference in its entirety for all purposes.

STATEMENT REGARDING FEDERALLY SPONSORED RESEARCH OR DEVELOPMENT

Not applicable.

FIELD

The present invention generally relates to image distortion correction, and more particularly to wide field image distortion correction using an orthogonal-transfer charge-coupled device (OTCCD).

BACKGROUND

Many line-scan remote sensing sensors utilize multiple stages of time delay and integration to enhance the final image signal-to-noise ratio. The swath width of these systems can be limited by optical distortion, which causes nonlinear image scanning and results in image smear at the edge of the field-of-view (FOV). This can also result in both along- (or vertical direction) and cross-track (or horizontal direction) image smear and degraded image quality at the swath edges. As such, image distortion can be inherent to the optical design of an imaging system. In other cases, image distortion can be caused by many factors, such as atmospheric turbulence, mechanical vibrations, or mechanical translations and articulations in sensor systems.

Some conventional systems have employed limiting the field of view or, in some cases, slightly shifting charges in the focal plane arrays to account for the distortion. Other conventional solutions have included revising the optical design of the imaging system. However, these conventional solutions increase the number of mechanical components, mechanical translations and cost of the overall system.

Conventional linear arrays of single-cell charge-coupled device (CCD) detectors can be used to linearly scan along a single axis to produce a digital image. Scanning takes place in a single direction where each line of information is captured, stored, and amplified. An ideal line-scan remote sensing system has the optical image scanned uniformly across a focal plane in the along-track direction. Thus, three-phase charge-coupled devices (CCD) can only shift pixel charges along one direction (i.e., the along-track direction). As such, there exists a need to shift pixel charges in multiple directions during image integration.

SUMMARY

In an aspect of the subject technology, a wide field of view line-scan remote sensing system is provided. The system includes an array of orthogonal transfer charge-coupled devices (OTCCDs) configured to record image data of an optical image of a moving object received from a lens; and a processor coupled to the array of OTCCDS, the processor configured to scan the optical image across the array of OTCCDs; and shift pixel charges along a first axis and a second axis that substantially matches an actual image motion of the moving object while the optical image is being scanned in order to reduce an amount of image distortion across the array of OTCCDs.

In another aspect of the subject technology, a method of correcting image distortion using an orthogonal transfer charge-coupled device (OTCCD) array is provided. The method includes the steps of scanning an optical image of a moving object across the OTCCD array; and shifting pixel charges along a first axis and a second axis that substantially matches an actual image motion of the moving object while the optical image is being scanned in order to reduce an amount of image distortion across the OTCCD array.

In still another aspect of the subject technology, a line-scan remote sensing system having an array of orthogonal transfer charge-coupled devices (OTCCDs) is provided. The system includes means for scanning an optical image of a moving object across the array of OTCCDs; and means for shifting pixel charges along a first axis and a second axis that substantially matches an actual image motion of the moving object while the optical image is being scanned in order to reduce an amount of image distortion across the array of OTCCDs.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

As previously discussed, there is a need for a system and/or methodology to shift pixel charges in multiple directions during image integration. The subject technology provides a method of compensating for image distortion across a wide field of view (FOV) by using an orthogonal transfer charge coupled device (OTCCD) to record the image data instead of a conventional charge coupled device (CCD). Orthogonal transfer charge-coupled device arrays, with the ability to shift pixel charges in any direction (or axis), can be used to compensate for the smear caused by optical distortion. That is, the accumulating exposure charges can be shifted in the cross-track direction to compensate for image distortion, while also being shifted in the along-track direction for time delay and integration (TDI). Various aspects of the subject technology will be discussed in greater detail with respect to FIGS. 5 and 6.

Figure 1:
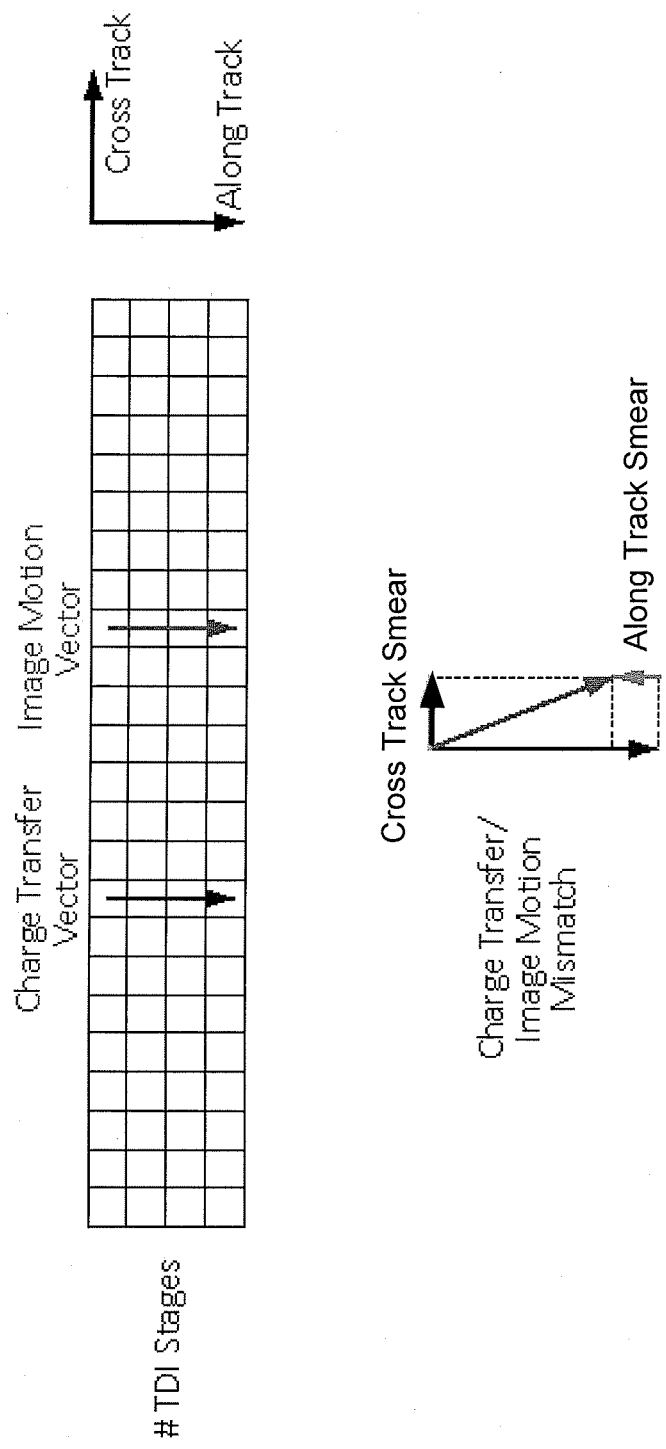
FIG. 1 is an illustration of a line-scan array utilizing multiple stages of time delay integration.

FIG. 1 is an illustration of a line-scan array utilizing multiple stages of time delay integration. Ideally, the image motion would be parallel to the direction and synchronized with the charge transfer. Any cross track image motion would yield cross track smear, while a TDI mismatch between the along track image motion and the charge transfer rate yields along track smear. Minimizing the smear in both the along- and cross-track directions would require tight control of system orientation.

Wide FOV imaging systems can exhibit distortion to some degree. That is, the image motion may not be uniform across the FOV. For example, the amount of cross track smear may vary across the FOV, such as having low smear in the center and large smear at the edges. As will be discussed with respect to FIG. 5, an orthogonal transfer technique could be used to compensate for this effect of distortion and reduce the cross track smear.

Figure 2A:
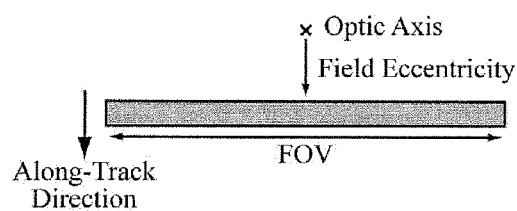
FIGS. 2A-2C are illustrations of a wide field of view line-scan array having TDI sensors.
Figure 2B:
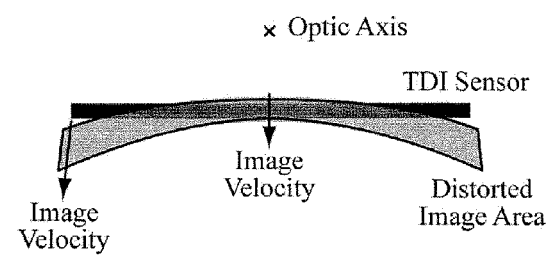
Figure 2C:
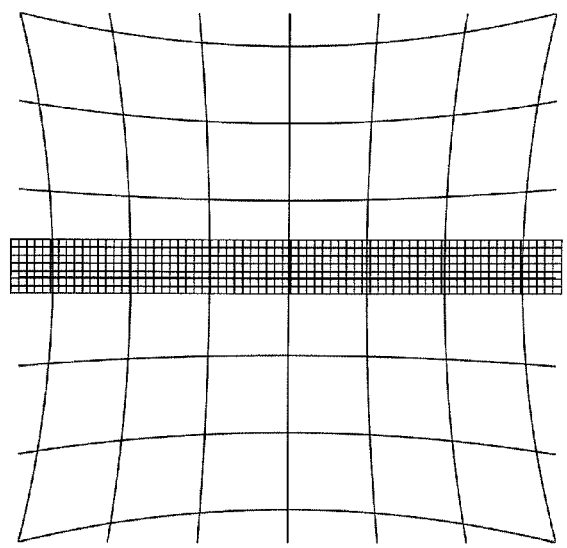

FIG. 2A-2C are illustrations of a wide field of view line-scan array having TDI sensors. FIGS. 2A and 2B depict diagrams illustrating the effect of pincushion distortion. FIG. 2A illustrates a rectangular region of the object. FIG. 2B illustrates the object imaged to a stretched/curved area of the image plane. For purposes of illustration in the present disclosure, the amount of distortion has been exaggerated in FIG. 2B. FIG. 2C illustrates a wide FOV having variations in image distortion between the center and edges of the FOV.

TDI technology can be used in line-scan array systems for detection with low-light levels where increased integration time may be desirable. Some of the conventional line-scan remote sensing systems utilize multiple stages of time delay integration (TDI) devices to enhance the final image signal-to-noise ratio. Other conventional TDI techniques may be employed because the effective exposure time can be increased.

Distortion at an image-plane TDI sensor can vary across the field of view. FIG. 2B illustrates the effect of distortion at the image-plane TDI sensor. For example, a thin rectangular region of the object (spanning the swath width of the system) can be imaged to a stretched/curved region in the image plane. Distortion can be thought of as a variation in the system magnification across the FOV. For pincushion distortion, the magnification can be greater at the edges of the FOV than at the center. Because of this, the velocity of the image motion at the swath edge can be greater than at the swath center. If the charge clocking of the TDI sensor is matched to the image velocity at the center of the FOV, the different image velocity at the edge of the FOV can result in along-track smear. Furthermore, since the system operates off-axis in field, distortion can cause the image motions at the swath edge and center to be non-parallel with each other. When the image motion at the center of the FOV is aligned to the direction of charge transfer between TDI stages, the different image motion direction at the edge of the FOV can cause cross-track smear. Thus, the distortion of the optical system can result in both along- and cross-track smear.

The area coverage rate of a line-scan remote sensing system can be increased by widening the system swath width or field-of-view (FOV). While a three-mirror anastigmatic (TMA) design can yield low optical wavefront error over a wide FOV by eliminating third-order spherical, coma, astigmatism, and field curvature, the usable FOV for such systems that employ time delay and integration (TDI) can be limited by image distortion. This is because distortion can cause the image motion across the detector to be non-uniform, resulting in both along- and cross-track image smear.

Figure 3:
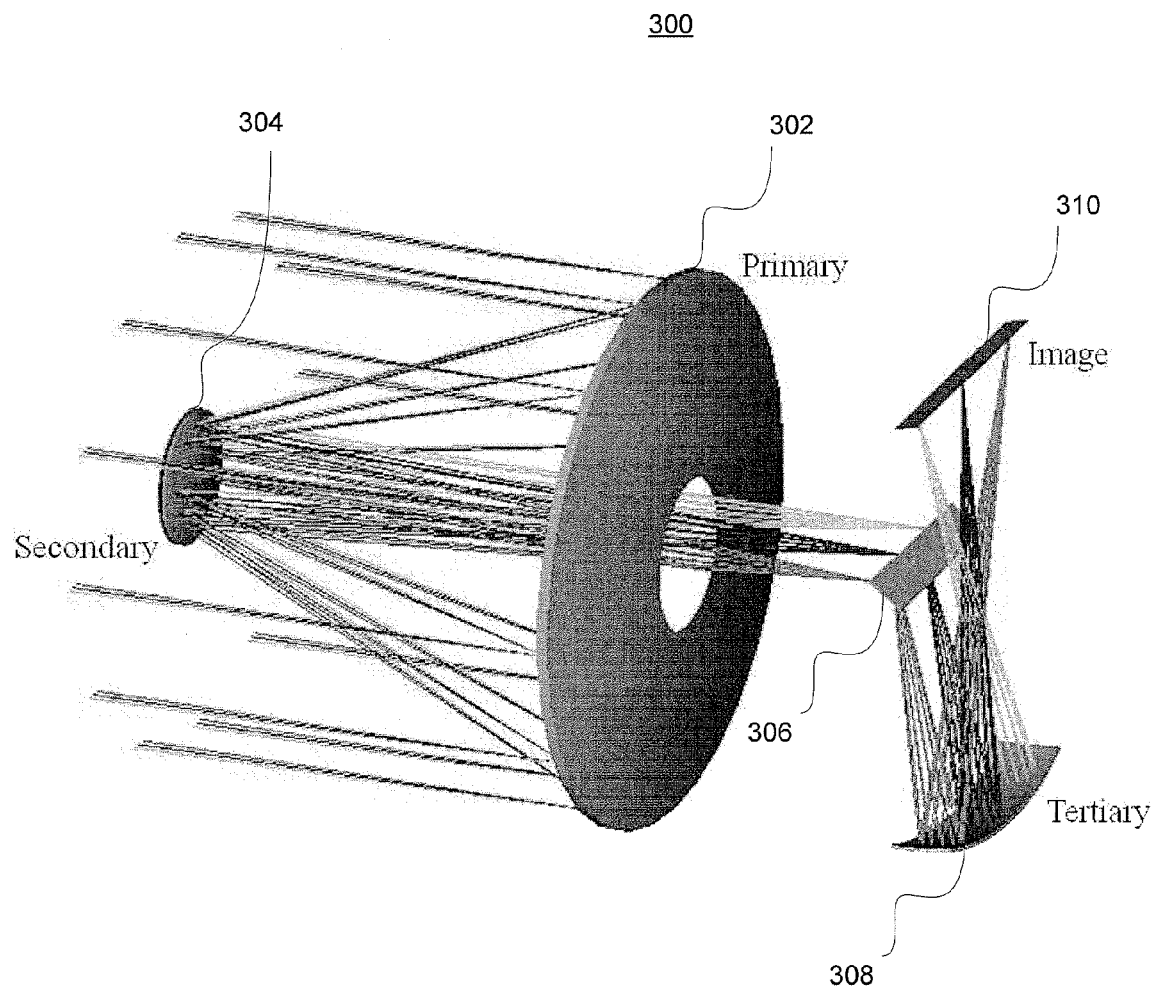
FIG. 3 is an illustration of a wide field of view remote sensing system utilizing a wide field of view line-scan array.

FIG. 3 is an illustration of a wide FOV remote sensing system 300 utilizing a wide field of view line-scan array. In an example, the system includes a primary mirror 302, a second mirror 304, a folding mirror 306, a tertiary minor 308, and a final image 310. Light from an observed object can project towards the primary mirror 302 and reflect towards the second minor 304. The secondary minor 304 can reflect the imaged object back towards the center of the primary mirror 302, and travel through the primary mirror 302 until being reflected off a folding mirror 306. The folding minor 306 projects the imaged object toward the tertiary mirror 308, which projects the final image 310 to its destination.

TABLE 1

Performance requirements for exemplary system

| Parameter | Value |
|---|---|
| Spectral Band | $\lambda = 0.4\text{-}0.9 \, \mu m$ (Panchromatic) |
| Ground Sample Distance | $GSD = 05 \cdot m$ |
| Swath Width | $S = 24.6 \, km$ |
| Orbital Altitude | $H = 750 \, km$ |
| Linear Full Field-of-View | $FOV = atan(S/H) = 1.8786 \, deg$ |

TABLE 1-continued

Performance requirements for exemplary system

| Parameter | Value |
| --- | --- |
| Aperture Diameter | D = 1 m |
| Effective Focal Length | EFL = 12 m |
| Nominal Wavefront Error | $\sigma_{RMS} < \lambda/14$ at $\lambda = 0.633$ μm |

Table 1 lists performance parameters of the wide field-of-view (FOV) remote sensing system 300. These parameters can be applicable to those for a panchromatic imaging channel of an imaging low-orbital satellite (e.g., Digital Globe's WorldView-2 satellite), with the exception of the swath width of S=24.6 km, which may be 50% larger than conventional satellites.

Table 2 contains an optical prescription of a three-mirror anastigmatic (TMA) telescope design for the exemplary wide FOV remote sensing system.

TABLE 2

Optical Prescription for exemplary system

| Surface | Radius of Curvature | Thickness | Conic Constant |
| --- | --- | --- | --- |
| Object | Infinity | Infinity | — |
| Primary Mirror | −2.400 | −0.972 | −0.985 |
| Secondary Mirror | −0.544 | 1.988 | −1.780 |
| Tertiary Mirror | −0.689 | −0.896 | −0.628 |
| Image | Infinity | — | — |

In addition to the performance parameters listed in Table 1, the focal ratio of the primary mirror can be constrained to be no faster than f/(1.2) while taking into account the overall system size during an optical design process. With an additional fold mirror 306, the total system length may be approximately 1.65 meters (m). Note that the exemplary wide FOV remote sensing system 300 can operate off-axis in field, with a field eccentricity of δ=0.5 deg. The mirror conic constants can be optimized to minimize the wavefront error (WFE) for field angles between δ=0.5 deg and [δ2+(FOV/2)2]½=1.0625 deg.

Figure 4A:
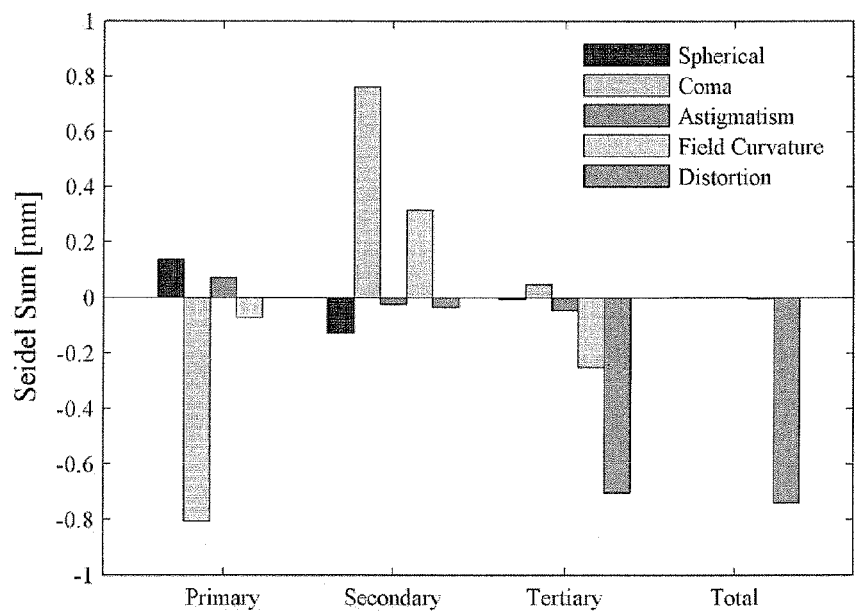
FIG. 4A is an illustration of a Seidel Sum plot depicting surface contributions across different sources of distortion.

FIG. 4A is an illustration of a Seidel Sum plot depicting surface contributions across different sources of distortion. The wide FOV remote sensing system 300 can exhibit pincushion distortion given the parameters as listed in Tables 1 and 2. FIG. 4 shows Seidel sum surface contributions that indicate that the tertiary mirror 308 may be a primary source of distortion. Methods of reducing system distortion may include increasing the magnification of the tertiary mirror 308 and using the tertiary mirror 308 at longer conjugate distances. Both of these approaches, however, increase the overall length of the optical system, which is undesirable.

Figure 4B:
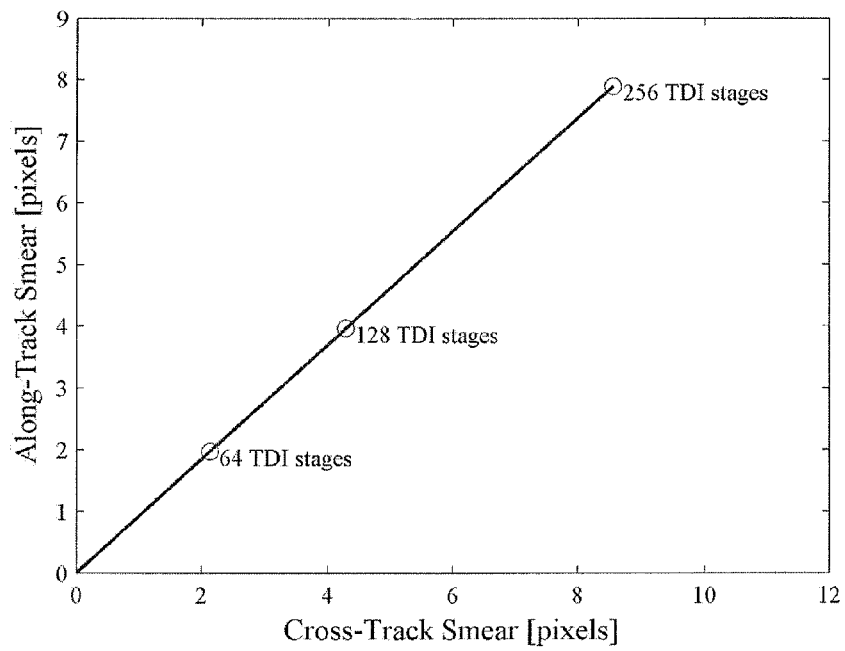
FIG. 4B is an illustration of a parameterized curve of an amount of image distortion at a swath edge as a function of the number of TDI stages.

FIG. 4B is a plot of the amount of along- and cross-track smear at a swath edge in units of image pixels parameterized by the number of TDI stages. Data for this curve can be obtained by tracing ray bundles through the wide FOV remote sensing system 300 for a sequence of field points in the along-track direction at both the swath center and swath edge. The image motion across the TDI sensor can be determined by tracking the location of the ray-bundle centroids as a function of the along-track field angle. Finally, the along- and cross-track smear data for FIG. 4B can be computed as the difference between the image motion at the swath edge and the motion of charge through the TDI stages, when the TDI charge clocking can be set to match the along-track image motion at the swath center. As provided in FIG. 4B, the amount of distortion in the form of along-track smear and cross-track smear can increase as the number of TDI stages increase in a system.

For an ideal line-scan system, the optical image is scanned uniformly across focal plane in the along-track direction. At the same time, the pixel charges of a CCD are shifted in the along-track direction to precisely match the image motion. This TDI technique can increase the effective exposure time and allows better image signal-to-noise ratios to be achieved. Optical distortion makes the image motion across the focal plane to be non-uniform, i.e., the direction and speed of the motion varies across the image swath width or field of view. To compensate for this effect, a series of OTCCD arrays in accordance with various aspects of the subject technology can be staggered across the focal plane to span the image swath width, and each OTCCD can be clocked to match the local image motion.

Figure 5:
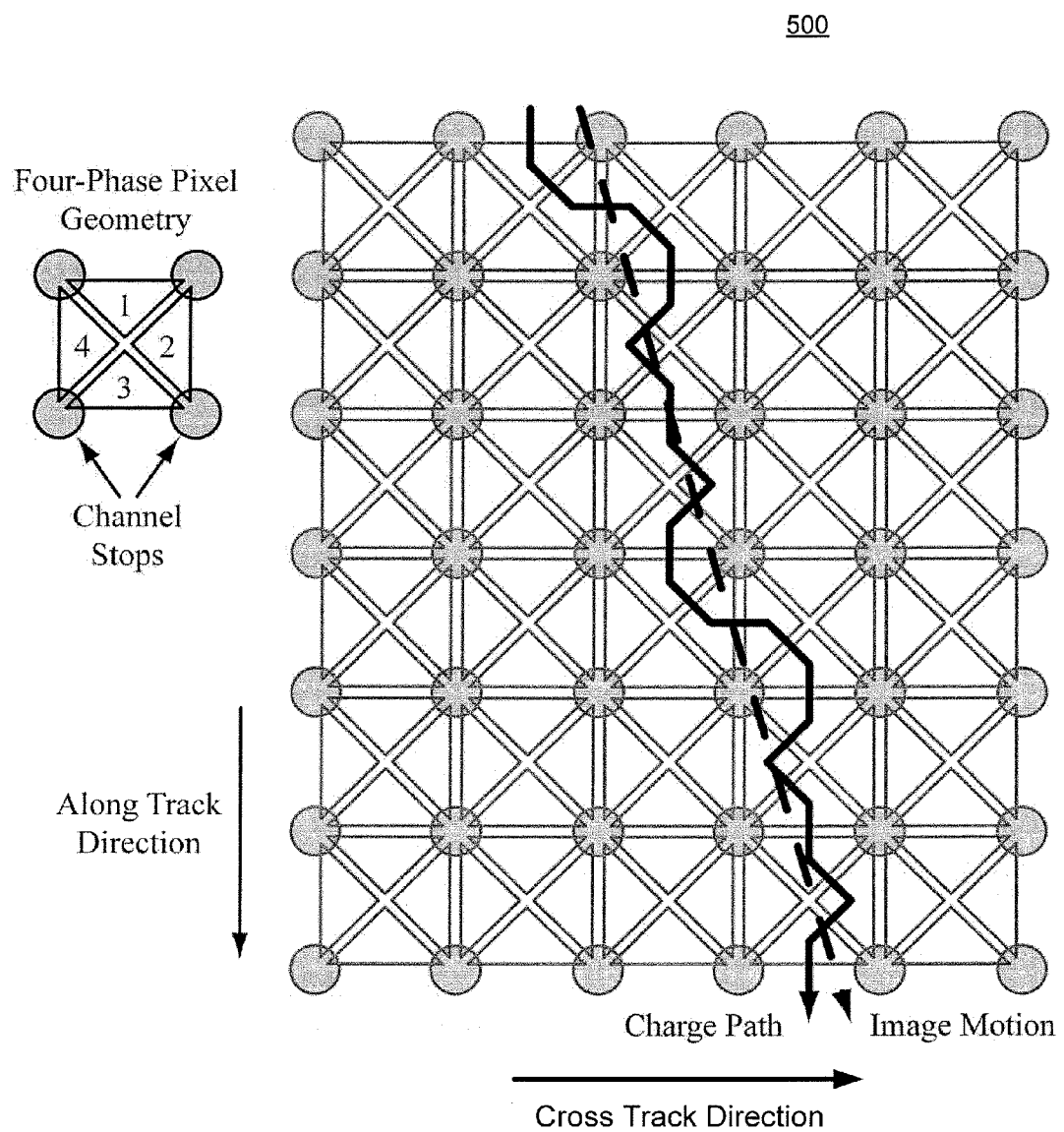
FIG. 5 is an exemplary diagram of an orthogonal transfer charge-coupled device (OTCCD) array in accordance with an embodiment of the subject technology.

FIG. 5 is an exemplary diagram of an orthogonal transfer charge-coupled device (OTCCD) array in accordance with an embodiment of the subject technology. An array of OTCCDs to compensate for distortion-induced smear at the FOV edge can be provided. Compared to a conventional three-phase CCD, which can only shift pixel charges along one direction (e.g., the vertical direction), an OTCCD uses a four-phase OTCCD pixel geometry that can allow pixel charges to be shifted along both the horizontal and vertical directions. Gigapixel arrays of OTCCD arrays can be implemented in satellite technologies (e.g., the Panoramic Survey Telescope and Rapid Response System a.k.a. Pan-STARRS). For Pan-STARRS, tip-tilt wavefront errors can be corrected electronically by shifting the pixel charges laterally on the OTCCDs during an exposure. This approach may be an alternative to using a fast steering mirror to stabilize optical image in the focal plane. In various aspects of the subject technology, the OTCCD can be implemented as an electronic alternative to correcting the optical distortion in a wide FOV line-scan remote sensing system.

Referring now to FIG. 5, the accumulating photoelectric charge can be transferred in a path (indicated by the bold solid line) that closely matches the actual image motion (indicated by the bold dashed line) in both the along- and cross-track directions using the four-phase OTCCD pixel geometry. FIG. 5 illustrates a 6×5 pixel section of an OTCCD array in accordance with an embodiment of the subject technology. The bold dashed line represents the motion of an image across the focal plane. The motion can be in the along-track (vertical) direction, but there can be enough cross-track motion to produce 2 pixels of cross-track smear as the image moves from the top to the bottom of the 6×5 pixel section. The bold solid line represents the corresponding path that the accumulating pixel charge can take as the image traverses the OTCCD array. Note that the charge path can follow the image motion to within a pixel.

Figure 6:
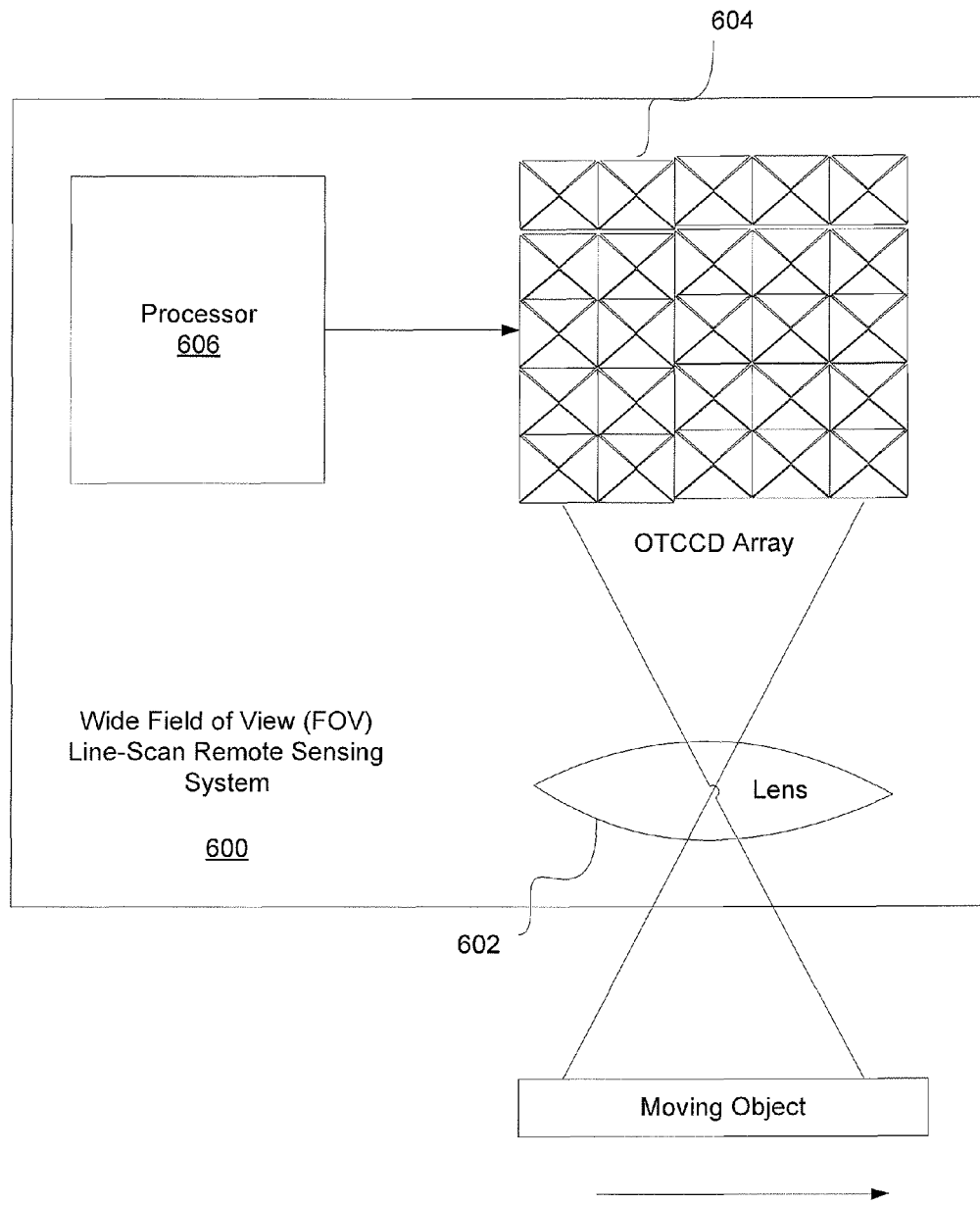
FIG. 6 is a exemplary diagram of a wide field of view line-scan remote sensing system employing an OTCCD array in accordance with an embodiment of the subject technology.

FIG. 6 is a exemplary diagram of a wide field of view line-scan remote sensing system with an OTCCD array in accordance with an embodiment of the subject technology. In various aspects of the subject technology, a wide field of view line-scan remote sensing system 600 is provided. The system 600 can include a lens 602 for producing an optical image of a moving object. The system 600 can also include an array 604 that has a plurality orthogonal transfer charge-coupled devices (OTCCDs), each OTCCD can be configured to record image data of the optical image of the moving object received from the lens 602. The system 600 can further include a processor 606 that is coupled to the array of OTCCDS 604. In various embodiments of the subject technology, the processor 606 can be configured to scan the optical image across the array of OTCCDs 604, and shift pixel charges along a first axis and a second axis that substantially matches an actual image motion of the moving object while the optical image is being scanned in order to reduce an amount of image distortion across the array of OTCCDs. In another aspect of the subject technology, a series of OTCCD arrays can be staggered across a focal plane of the wide field of view line-scan remote sensing system that span an image swath width of the optical image.

In another embodiment, the processor 606 can shift the pixel charges along the first axis to reduce an amount of image distortion in an along-track direction. In still another embodiment, the processor 606 can shift the pixel charges along the second axis to reduce an amount of image distortion in a cross-track direction. The processor 606 can shift the pixel charges to increase the effective exposure time of the scanned optical image. The processor 606 can also shift the pixel charges to increase signal-to-noise ratios of the scanned optical image.

In still another embodiment, the processor 606 can be further configured to match a rate of shifting the pixel charges with a velocity of the actual image motion in each direction at an edge of a field of view. As such, the processor 606 can be further configured to match a rate of shifting the pixel charges with a velocity of the actual image motion in each direction at a center of the field of view. In some embodiments, the amount of image distortion at the edge of the field of view is greater than the amount of image distortion at the center of the field of view.

In yet another embodiment, the processor 606 can be further configured to shift the pixel charges at different rates between a center and an edge of a field of view based on a mean image velocity of the actual image motion across the field of view. Moreover, the processor 606 can be further configured to step through an electronic timing sequence to shift charges between each pixel of the array of OTCCDs that resides along a path that substantially matches the actual image motion. Furthermore, the processor 606 can be further configured to employ time delay integration using the array of OTCCDs.

In other embodiments, the processor 606 can be further configured to detect image distortion at an edge of a field of view when a charge transfer direction along the x-axis is matched with the actual image motion at a center of the field of view; and align the actual image motion at the edge of the field of view with the charge transfer direction moving along the second axis while the charge transfer direction along the first axis remains aligned with the actual image motion at the center of the field of view.

Several images can be generated to demonstrate the effect of distortion with conventional TDI and the benefit of distortion compensation with an OTCCD. This can be done using a linear-system approach, which assumes isoplanatic imaging conditions over a small region at the swath edge. A net transfer function for the system can be formed as the product of a spectrally-averaged optical transfer function, a pixel integration transfer function, and a smear transfer function due to image distortion and time delay integration. A nominal wavefront error at the swath edge of the exemplary wide FOV system (FIG. 6) can be provided using a corresponding optical point spread function, which can be averaged over a 0.4-0.9 μm spectral band in ground coordinates. The optical transfer function $H_{opt}(u,v)$ can be the Fourier transform of an optical point spread function.

The pixel integration transfer function can be given by the following mathematical expression:

$$H_{pix}(u,v) = \sin c(u) \sin c(v),$$

where (u,v) are spatial frequency coordinates in units of cycles per pixel and it can be assumed that the pixels are square with a 100% fill factor. Note that an assumption of square pixels can be an approximation, since the charge-collection area for a given pixel may not be square for the OTCCD pixel geometry shown in FIG. 5. In various aspects, the shape of the instantaneous charge-collection area can change as charges shift across the OTCCD array. The square-pixel approximation can be used here, because the development of an accurate model of $H_{pix}(u,v)$ for the OTCCD array is beyond the scope of this disclosure.

The smear transfer function associated can be computed as a two-dimensional expression, as follows:

$$H_{smr}(u, v) = \frac{1}{K}\sum_{k=1}^{K}\exp[i2\pi(\Delta_{x,k}u + \Delta_{y,k}v)]\text{sinc}[(\Delta_{x,k+1} - \Delta_{x,k})u + (1 + \Delta_{y,k+1} - \Delta_{y,k})v],$$

where subscript k∈{1, 2, ..., K} can be used to index the various TDI stages and (Δx, k, Δy, k) can be the differences between the optical image and pixel/charge motion across the TDI sensor. The effect of the gross mismatch between optical image and charge motion can be captured in the exponential term of the above-identified equation, while the smear associated with image motion between charge transfers can be represented by the sin c(x) term. The net system transfer function $H_{net}(u,v)$ can be the product of $H_{opt}(u,v)$, $H_{pix}(u,v)$, and $H_{smr}(u,v)$. The net system point spread function for this scenario may be the inverse Fourier transform of $H_{net}(u,v)$.

For scenarios in which an OTCCD would be used for distortion compensation, the motion of pixel charge in the along- and cross-track directions can be matched to the image motion at the swath edge to the nearest pixel. While the four-phase OTCCD pixel design illustrated in FIG. 5 may be capable of tracking the image motion with sub-pixel accuracy, the motion of charge across the OTCCD could be modeled at the resolution of individual pixels. The OTCCD charge clocking rates in both the along- and cross-track directions can be matched to the mean image velocity in each direction at the swath edge. Then the smear transfer function can be recomputed with values of (Δx, k, Δy, k) corresponding to the differences between the image and pixel/charge motion across the OTCCD array.

Figure 7A:
FIGS. 7A-7D are illustrations of an image employing image distortion compensation using OTCCD in accordance with an embodiment of the subject technology.
Figure 7C:
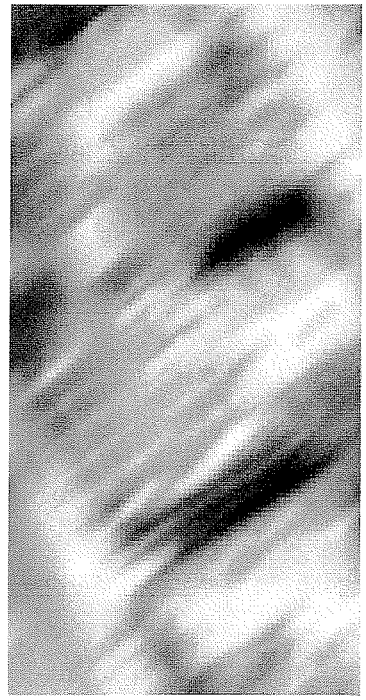
Figure 7B:
Figure 7D:

FIGS. 7A-7D contain several simulation results in accordance with an embodiment of the subject technology. The aerial image, shown in FIG. 7A, with 6-inch ground sampling can be used as the input scene for simulations of the subject technology. For comparison with other images, FIG. 7B shows an image as viewed at the swath center with 256 stages of conventional TDI. In this example, there is no image smear in the image because the TDI charge clocking has been matched to the image motion at the swath center. FIG. 7C shows the corresponding image as viewed at the swath edge with 256 stages of conventional TDI. The quality of this image is severely degraded by the approximately eight (8) pixels of both along- and cross-track smear due to image distortion. FIG. 7D shows the corresponding image when an OTCCD array is employed to match the image motion at the swath edge. Comparing the images in the top and bottom rows of the figure, the benefit of the distortion compensation method can be readily seen. While there may be less smear with fewer TDI stages, there is a noticeable image-quality improvement offered by the distortion compensation apparatus and method in the present disclosure.

The previous description is provided to enable any person skilled in the art to practice the various aspects described herein. The previous description provides various examples of the subject technology, and the subject technology is not limited to these examples. There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

One or more processors in a multi-processing arrangement may also be employed to execute the sequences of instructions contained in processor 606. In some aspects, hard-wired circuitry may be used in place of or in combination with software instructions to implement various aspects of the subject disclosure. Thus, aspects of the subject disclosure are not limited to any specific combination of hardware circuitry and software.

Various aspects of the subject technology can be implemented in a "machine-readable medium," or "computer-readable medium," which refers to any medium that participates in providing instructions to processor 606 for execution. Such a medium may take many forms, including, but not limited to, non-volatile media, and volatile media. Non-volatile media include, for example, optical or magnetic disks. Volatile media include dynamic memory. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

The various illustrative blocks, modules, devices and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

All structural and functional equivalents to the elements of the various aspects described throughout this disclosure that are known or later come to be known to those of ordinary skill in the art are expressly incorporated herein by reference and are intended to be encompassed by the subject technology. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

The claims herein are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. Underlined and/or italicized headings and subheadings are used for convenience only, do not limit the subject technology, and are not referred to in connection with the interpretation of the description of the subject technology.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

What is claimed is:

1. A wide field of view line-scan remote sensing system, comprising:
   an array of orthogonal transfer charge-coupled devices (OTCCDs) configured to record image data of an optical image of a moving object received from a lens; and
   a processor coupled to the array of OTCCDs, the processor configured to:
   scan the optical image across the array of OTCCDs; and
   shift pixel charges along a first axis and a second axis that substantially matches an actual image motion of the moving object while the optical image is being scanned in order to reduce an amount of image distortion across the array of OTCCDs, wherein the processor is configured to shift the pixel charges at a first rate at a center of a field of view of the wide field of view line-scan remote sensing system and at a second rate at an edge of the field of view of the wide field of view line-scan remote sensing system.

2. The system of claim 1, wherein a series of OTCCD arrays are staggered across a focal plane of the wide field of view line-scan remote sensing system that span an image swath width of the optical image.

3. The system of claim 1, wherein the processor is configured to:
shift the pixel charges along the first axis to reduce an amount of image distortion in an along-track direction, and
shift the pixel charges along the second axis to reduce an amount of image distortion in a cross-track direction.

4. The system of claim 1, wherein the processor is configured to shift the pixel charges to increase an effective exposure time of the scanned optical image.

5. The system of claim 1, wherein the processor is configured to shift the pixel charges to increase signal-to-noise ratios of the scanned optical image.

6. The system of claim 1, wherein the processor is further configured to match a rate of shifting the pixel charges with a velocity of the actual image motion in each direction at the edge of the field of view.

7. The system of claim 6, wherein the processor is further configured to match a rate of shifting the pixel charges with a velocity of the actual image motion in each direction at the center of the field of view.

8. The system of claim 7, wherein the shift of the pixel charges reduces image distortion that causes image motions at the center and edge of the field of view to differ.

9. The system of claim 1, wherein the processor is configured to shift the pixel charges at different rates based on a mean image velocity of the actual image motion across the field of view.

10. The system of claim 1, wherein the processor is further configured to step through an electronic timing sequence to shift charges between each pixel of the array of OTCCDs that resides along a path that substantially matches the actual image motion.

11. The system of claim 1, wherein the processor is further configured to employ time delay integration using the array of OTCCDs.

12. The system of claim 1, wherein the processor is further configured to:
detect image distortion at the edge of the field of view when a charge transfer direction along the first axis is matched with the actual image motion at the center of the field of view; and
align the actual image motion at the edge of the field of view with the charge transfer direction moving along the second axis while the charge transfer direction along the first axis remains aligned with the actual image motion at the center of the field of view.

13. The system of claim 1, wherein the image distortion comprises a distortion resulting from variation in magnification across the field of view.

14. The system of claim 1, wherein each of the series of OTCCD arrays is associated with a respective portion of the field of view and is configured to match an image motion associated with the respective portion of the field of view.

15. A method of correcting image distortion using an orthogonal transfer charge-coupled device (OTCCD) array, the method comprising:
scanning an optical image of a moving object across the OTCCD array; and
shifting pixel charges along a first axis and a second axis that substantially matches an actual image motion of the moving object while the optical image is being scanned in order to reduce an amount of image distortion across the OTCCD array, wherein the shifting comprises shifting the pixel charges at a first rate at a center of a field of view and at a second rate at an edge of the field of view.

16. The method of claim 15, wherein shifting pixel charges along the first axis reduces an amount of image distortion in an along-track direction.

17. The method of claim 15, wherein shifting pixel charges along the second axis reduces an amount of image distortion in a cross-track direction.

18. The method of claim 15, wherein shifting the pixel charges increases an effective exposure time of the scanned optical image and increases signal-to-noise ratios of the scanned optical image.

19. The method of claim 15, wherein shifting the pixel charges comprises matching a rate of shifting the pixel charges with a velocity of the actual image motion in each direction at the edge of the field of view.

20. The method of claim 19, wherein shifting the pixel charges comprises matching a rate of shifting the pixel charges with a velocity of the actual image motion in each direction at the center of the field of view.

21. The method of claim 20, wherein shifting the pixel charges reduces image distortion that causes image motions at the center and edge of the field of view to differ.

22. The method of claim 15, wherein shifting the pixel charges at different rates is based on a mean image velocity of the actual image motion across the field of view.

23. The method of claim 15, wherein shifting the pixel charges comprises stepping through an electronic timing sequence to shift charges between each pixel of the array of OTCCDs that resides along a path that substantially matches the actual image motion.

24. The method of claim 15, wherein shifting the pixel charges comprises employing time delay integration.

25. The method of claim 15, further comprising:
detecting image distortion at the edge of the field of view when a charge transfer direction along the first axis is matched with the actual image motion at the center of the field of view; and
aligning the actual image motion at the edge of the field of view with the charge transfer direction moving along the second axis while the charge transfer direction along the first axis remains aligned with the actual image motion at the center of the field of view.

26. A line-scan remote sensing system having an array of orthogonal transfer charge-coupled devices (OTCCDs), the system comprising
means for scanning an optical image of a moving object across the array of OTCCDs; and
means for shifting pixel charges along a first axis and a second axis that substantially matches an actual image motion of the moving object while the optical image is being scanned in order to reduce an amount of image distortion across the array of OTCCDs, wherein the means for shifting comprises means for shifting the pixel charges at a first rate at a center of a field of view and at a second rate at an edge of the field of view.

27. The system of claim 26, wherein the means for shifting pixel charges along the first axis reduces an amount of image distortion in an along-track direction.

28. The system of claim 26, wherein the means for shifting pixel charges along the second axis reduces an amount of image distortion in a cross-track direction.

29. The system of claim 26, wherein the means for shifting the pixel charges increases the effective exposure time of the scanned optical image.

30. The system of claim 26, wherein the means for shifting the pixel charges increases signal-to-noise ratios of the scanned optical image.

31. The system of claim 26, wherein the means for shifting the pixel charges comprises means for matching a rate of shifting the pixel charges with a velocity of the actual image motion in each direction at the edge of the field of view.

32. The system of claim 31, wherein the means for shifting the pixel charges comprises means for matching a rate of shifting the pixel charges with a velocity of the actual image motion in each direction at the center of the field of view.

33. The system of claim 32, wherein the means for shifting the pixel charges reduces image distortion that causes image motions at the center and edge of the field of view to differ.

34. The system of claim 26, wherein the means for shifting the pixel charges at different rates is based on a mean image velocity of the actual image motion across the field of view.

35. The system of claim 26, wherein the means for shifting the pixel charges comprises means for stepping through an electronic timing sequence to shift charges between each pixel of the array of OTCCDs that resides along a path that substantially matches the actual image motion.

36. The system of claim 26, wherein the means for shifting the pixel charges comprises means for employing time delay integration using the array of OTCCDs.

37. The system of claim 26, further comprising:
means for detecting image distortion at the edge of the field of view when a charge transfer direction along the first axis is matched with the actual image motion at the center of the field of view; and
means for aligning the actual image motion at the edge of the field of view with the charge transfer direction moving along the second axis while the charge transfer direction along the first axis remains aligned with the actual image motion at the center of the field of view.

* * * * *